US010601082B2

(12) United States Patent
Huang et al.

(10) Patent No.: US 10,601,082 B2
(45) Date of Patent: Mar. 24, 2020

(54) SIGNAL COLLECTION ASSEMBLY AND POWER BATTERY MODULE COMPRISING THE SAME

(71) Applicant: BYD COMPANY LIMITED, Shenzhen (CN)

(72) Inventors: Yan Huang, Shenzhen (CN); Qun Zhou, Shenzhen (CN); Yingying Wang, Shenzhen (CN); Zhiming Gu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 111 days.

(21) Appl. No.: 15/191,247

(22) Filed: Jun. 23, 2016

(65) Prior Publication Data

US 2016/0308256 A1 Oct. 20, 2016

Related U.S. Application Data

(63) Continuation of application No. PCT/CN2014/095428, filed on Dec. 29, 2014.

(30) Foreign Application Priority Data

Dec. 31, 2013 (CN) .................... 2013 2 0892396 U
Dec. 31, 2013 (CN) .................... 2013 2 0892866 U

(51) Int. Cl.
*H01M 10/42* (2006.01)
*H01M 10/48* (2006.01)
(Continued)

(52) U.S. Cl.
CPC ..... *H01M 10/4257* (2013.01); *H01M 2/1077* (2013.01); *H01M 2/202* (2013.01);
(Continued)

(58) Field of Classification Search
CPC .......... H01M 10/4257; H01M 2/1077; H01M 2/202; H01M 2/206; H01M 2/222;
(Continued)

(56) References Cited

U.S. PATENT DOCUMENTS 5,645,932 A * 7/1997 Uchibori ............ G06K 19/0672
156/248
6,423,441 B1 * 7/2002 Ronning ................ H01M 2/202
361/748
(Continued)

FOREIGN PATENT DOCUMENTS

CN 201303033 Y 9/2009
CN 102544616 A 7/2012
(Continued)

OTHER PUBLICATIONS

International Search Report and Written Opinion for PCT/CN2014/095428, dated Feb. 17, 2015, 13 pages.

*Primary Examiner* — Helen Oi K Conley

(57) ABSTRACT

A signal collection assembly and a power battery module are provided. The signal collection assembly includes: a substrate; a signal collection line including a sheet-like metal conductive element disposed on the substrate; a signal collection member disposed on the substrate and connected with the signal collection line; and a signal collection terminal disposed on the substrate. The signal collection terminal includes a first terminal connected with the signal collection line and a second terminal connected with a power connection member of the power battery module.

16 Claims, 2 Drawing Sheets

(51) Int. Cl.
*H01M 2/20* (2006.01)
*H01M 2/10* (2006.01)
*H01M 2/22* (2006.01)
*H01M 2/34* (2006.01)
*B60L 58/10* (2019.01)

(52) U.S. Cl.
CPC ............ *H01M 2/206* (2013.01); *H01M 2/22* (2013.01); *H01M 2/348* (2013.01); *H01M 10/425* (2013.01); *H01M 10/48* (2013.01); *H01M 10/482* (2013.01); *B60L 58/10* (2019.02); *H01M 2010/4271* (2013.01); *H01M 2010/4278* (2013.01); *H01M 2200/103* (2013.01); *H01M 2220/20* (2013.01)

(58) Field of Classification Search
CPC .... H01M 2/348; H01M 10/425; H01M 10/48; H01M 10/482
See application file for complete search history.

(56) References Cited

U.S. PATENT DOCUMENTS

| | | | |
|---|---|---|---|
| 8,465,656 | B2 | 6/2013 | Nagao et al. |
| 9,196,887 | B2 | 11/2015 | Sasada et al. |
| 9,831,535 | B2 | 11/2017 | Nishihara et al. |
| 2010/0139959 | A1 | 6/2010 | Nagao et al. |
| 2011/0076521 | A1 | 3/2011 | Shimizu et al. |
| 2011/0104840 | A1 | 5/2011 | Burdinski et al. |
| 2011/0248719 | A1 | 10/2011 | Aoki |
| 2012/0019061 | A1* | 1/2012 | Nishihara ............ H01M 2/1077 307/10.1 |
| 2012/0148876 | A1 | 6/2012 | Zeng et al. |
| 2012/0276419 | A1 | 11/2012 | Park |
| 2013/0260193 | A1* | 10/2013 | Sasada .................. H01M 2/206 429/62 |
| 2014/0017532 | A1 | 1/2014 | Nishihara et al. |
| 2014/0162101 | A1 | 6/2014 | Wang et al. |

FOREIGN PATENT DOCUMENTS

| | | | |
|---|---|---|---|
| CN | 102956934 A | 3/2013 | |
| CN | 103367678 A | 10/2013 | |
| CN | 203746993 U | 7/2014 | |
| CN | 203839479 U | 9/2014 | |
| EP | 2244321 A1 | 10/2010 | |
| EP | 2546906 A1 | 1/2013 | |
| JP | 2008-078250 A | 4/2008 | |
| JP | WO2011/111676 | * 9/2011 | ............. H01M 2/20 |
| JP | 2011213492 A | 10/2011 | |
| JP | 2013-109927 A | 6/2013 | |
| JP | 2013-206696 A | 10/2013 | |
| JP | 2013206696 A | 10/2013 | |
| KR | 20070092219 A | 9/2007 | |
| WO | 2009-034764 A1 | 3/2009 | |
| WO | 2012-133592 A1 | 10/2012 | |
| WO | 2014/184920 A1 | 11/2014 | |

* cited by examiner

SIGNAL COLLECTION ASSEMBLY AND POWER BATTERY MODULE COMPRISING THE SAME

CROSS REFERENCE TO RELATED APPLICATION

This application is a continuation application of International Application No. PCT/CN2014/095428, filed on Dec. 29, 2014, which is based on and claims priority and benefits of Chinese Patent Applications No. 201320892866.9 and No. 201320892396.6, both filed with State Intellectual Property Office on Dec. 31, 2013. The entire contents of the above-referenced applications are incorporated herein by reference.

FIELD

Embodiments of the present disclosure generally relate to a battery field, and more particularly to a signal collection assembly and a power battery module having the signal collection assembly.

BACKGROUND

Along with the exhaustion of oil energy and the higher requirements for environment protection, an electric vehicle or hybrid vehicle plays an important role in the land transportation. As a core power source of the electric vehicle, a power battery module should have a good safety performance and high reliability. The power battery module mounted in vehicle comprises tens or hundreds of, even thousands of single batteries connected in series or parallel. In order to properly manage the battery system of the vehicle, signals, such as voltage signals, temperature signals, of each single battery in battery group should be collected so as to provide basis for running strategy, for example safety driving. However, a traditional signal collection assembly has a relatively complex structure, and a relatively low reliability. Also, the traditional signal collection assembly may have many deficiencies, such as loose in structure, large in volume, high in cost, difficult to maintenance, poor sealing, and long developing period. Thus there is a need to improve the structure of the traditional signal collection assembly.

SUMMARY

Embodiments of the present disclosure seek to solve at least one of the problems existing in the related art to at least some extent.

Embodiments of a first broad aspect of the present disclosure provide signal collection assembly of a power battery module including: a substrate; a signal collection line including a sheet-like conductive metal element disposed on the substrate; a signal collection member disposed on the substrate and connected with the signal collection line; and a signal collection terminal disposed on the substrate and including a first terminal connected with the signal collection line and a second terminal connected with a power connection member of the power battery module.

With the signal collection assembly according to embodiments of the present disclosure, the signal collection line, the signal collection member and signal collection terminal are integrated on the substrate. Thus, the signal collection assembly has a small size, a light weight, a low cost and is easy to be manufactured and assembled, thus having increased assembly efficiency and being suitable for the automatic production. Moreover, the signal collection may have a high reliability; and friction between the lines or wires, and an insulation failure due to collision may be effectively avoided; and defection of messy structure of traditional signal collection member may be eliminated. The signal collection assembly of the present disclosure may have a wide application. When the signal collection is used in a different environment where different signals need to be collected, the signals may be connected only by arranging corresponding signal collection members and signal collection terminals on the signal collection assembly, without redesigning the whole signal collection assembly. Therefore, the signal collection assembly according to embodiments of the present disclosure may be convenient for use.

Embodiments of a second broad aspect of the present disclosure provide power battery module, including: the signal collection assembly described above, and a battery group including a plurality of batteries, in which adjacent batteries are electrically connected with each other by the power connection member of the power battery module, and the second terminal of the signal collection terminal of the signal collection assembly is electrically connected with the power connection member.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
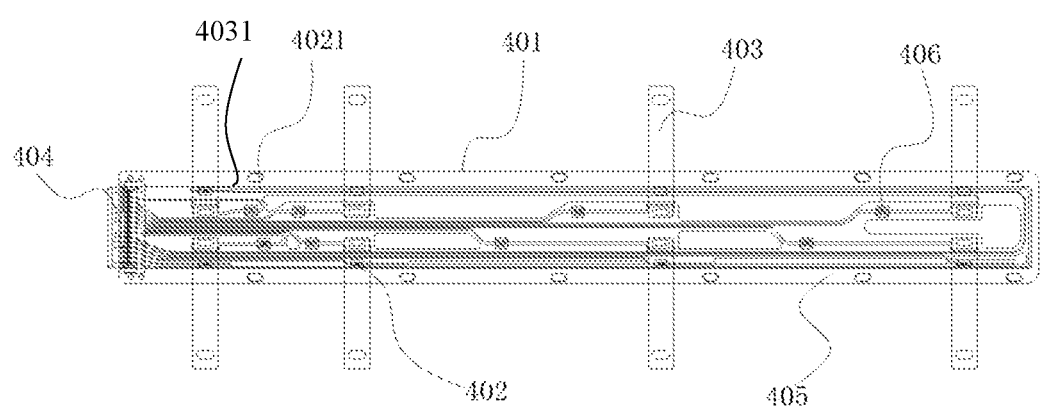
FIG. 1 is a schematic view of a signal collection assembly of power battery module according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

A signal collection assembly 400 of a power battery module according to embodiments of the present disclosure will be described in the following with reference to FIGS. 1-2.

Figure 2:
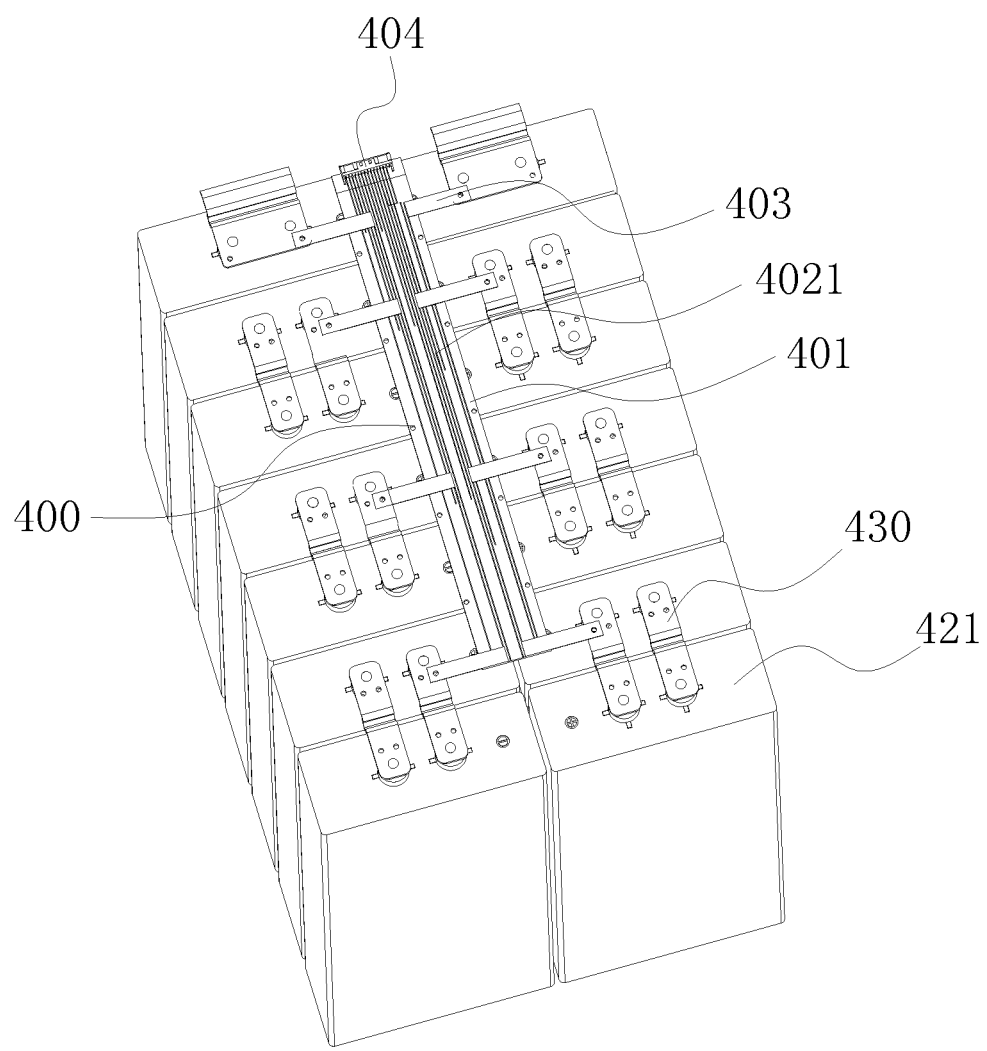
FIG. 2 is a schematic view of a portion of a power battery module according to an embodiment of the present disclosure.

As shown in FIG. 1 and FIG. 2, the signal collection assembly 400 according to embodiments of the present disclosure includes: a substrate 401, a signal collection line 4021, a signal collection member 402 and a signal collection terminal 403.

In some embodiments, the signal collection line 4021 includes a sheet-like conductive metal element disposed on the substrate 401, and the signal collection member 402 is disposed on the substrate 401 and connected with the signal collection line 4021. The signal collection terminal 403 is disposed on the substrate 401 and has a first terminal and a second terminal. The first terminal of the signal collection terminal 403 is connected with the signal collection line 4021, and the second terminal of the signal collection terminal 403 is connected with a power connection member 430 of the power battery module.

With the signal collection assembly 400 according to embodiments of the present disclosure, the signal collection line 4021, the signal collection member 402 and the signal collection terminal 403 are integrated on the substrate 401. Thus, the signal collection assembly 400 has a small size, a light weight, a low cost and is easy to be manufactured and assembled, having increased assembly efficiency and being suitable for the automatic production. Moreover, the signal collection 400 may have a high reliability; and both friction between the lines or wires and an insulation failure due to collision may be effectively avoided; and defection of messy structure of traditional signal collection member may be eliminated. The signal collection assembly 400 of the present disclosure may have a wide application. When the signal collection is used in a different environment where different signals need to be collected, the signals may be connected only by arranging corresponding signal collection members 402 and signal collection terminals 403 on the signal collection assembly 400, without redesigning the whole signal collection assembly 400. Therefore, the signal collection assembly 400 according to embodiments of the present disclosure may be convenient for use.

In some embodiments of the present disclosure, as shown in FIG. 2, the power battery module 420 includes a plurality of batteries 421, two adjacent batteries 421 are connected with each other via the power connection member 430, the signal collection terminal 403 is connected with two power connection members 430 disposed on two sides thereof so as to detect a signal or data of different battery 421.

In some embodiments, the signal collection terminal 403 of the signal collection assembly 400 is connected with the power connection member 430 of the power battery module 420. In order to facilitate the connection between the signal collection terminal 403 and the power connection member 430, in some embodiments of the present disclosure, the second terminal of the signal collection terminal 403 extends beyond the edge of the substrate 401. Then the signal collection terminal 403 may be connected with different power connection members 430 of different batteries easily.

In an embodiment of the present disclosure, the signal collection assembly 400 further includes a connector 404 connected with the signal collection 4021. In some embodiments, the connector 404 according to embodiments of the present disclosure is configured to electrically couple with the signal collection line 4021 and is adapted to couple with an external signal output device and an external power connection device, and the connector 404 may be selected according to practical conditions, such as a FPC or PCB connector which is commercially available.

An assembling relationship between the connector 404 and the substrate 401 is not particularly limited, provided that the connector 404 can be coupled with the external signal output device and the external power connection device to implement the signal transmission and the power connection. Alternatively, the connector 404 is disposed on the substrate 401. Alternatively, the connector 404 is disposed at an edge of the substrate 401. In some embodiments, the second terminal of the signal collection line 4021 extends to the edge of the substrate 401. Thus, it is convenient for the connector 404 to couple with the external signal output device and the external power connection device.

In an embodiment of the present disclosure, the substrate 401 is a flexible board. When the substrate 401 is used to connect the power batteries with each other, the flexible substrate 401 can be suitable for reducing relative displacements and assembly tolerances between the power batteries, thus improving the reliability of the signal connection assembly.

In some embodiments, the substrate 401 may be made of flexible materials, such as a polyimide (PI) film. The connector 404 is connected with the substrate 401. The substrate 401 is connected with the external signal output device and the external power connection device via the connector 404, in which a connection manner thereof may be welding such as tin soldering, a mechanical connection, and connections thereof. A structure of the FPC or PCB connector is known to those skilled in the related art, and thus details thereof are omitted herein.

A structure of the signal collection line 4021 is not limited, and an assembling manner of the each of the signal collection line 4021 on the substrate 401 is not limited as well. In an embodiment of the present disclosure, the signal collection line 4021 includes a conductive metal sheet fixed on the substrate 401. In some embodiments, the conductive metal sheet forming the signal collection line 4021 is fixed on the substrate 401 by at least one of adhering, injection molding, hot pressing and welding.

In other words, the signal collection line 4021 is integrated on the substrate 401 by adhering, injection molding, hot pressing or welding. Thus, it is easy to integrate the signal collection line 4021 on the substrate 401 by using these methods, and thus a difficulty of forming the signal collection assembly 400 may be reduced.

In an embodiment of the present disclosure, the signal collection line 4021 includes a conductive metal layer formed on the substrate 401. In some embodiments, the conductive metal layer is a conductive metal coating on the substrate 401. In other words, the signal collection line 4021 is the conductive metal coating formed on the substrate 401, and the conductive metal coating may be formed by electroplating or chemical plating. Thus, it is more convenient to form and integrate the signal collection line 4021 on the substrate 401 without a secondary connection or assembling, thus improving an accuracy and reliability of the signal transmission and power connection.

In an embodiment of the present disclosure, the substrate 401 is a flexible board and the signal collection line 4021 is formed by etching a conductive metal foil on the substrate 401. In other words, the signal collection line 4021 is formed on the substrate 401 by etching. Thus, it is convenient for forming the signal collection line 4021 on the substrate 401.

In some embodiments, a line slot (not shown) may be formed in a surface of the substrate 401, and the signal collection line 4021 is disposed in the line slot. Thus, by disposing the signal collection line 4021 in the line slot, the line slot has a function of protecting the signal collection line 4021, thus improving the reliability of the signal collection assembly 400.

There are no special limitations for forming the signal collection line 4021 in the line slot. In an embodiment of the present disclosure, the signal collection line 4021 includes a conductive metal sheet fixed in the line slot or a conductive metal coating formed in the line slot. In another embodiment of the present disclosure, the signal collection line 4021 is formed by etching the conductive metal foil in the line slot. A structure of the signal collection line 4021 in the line slot is similar to that of the above signal collection line 4021 disposed on the substrate 401, and details thereof are omitted herein.

A structure of the signal collection member 402 may be selected according to data or signal to be collected. In an embodiment of the present disclosure, the signal collection member 402 includes at least one of a temperature sensing element, a humidity sensing element, a pressure sensing element, a concentration sensing element, and a voltage sensing element. In other words, the signal collection member 402 according to embodiments of the present disclosure may be selected from: the temperature sensing element, the humidity sensing element, the pressure sensing element, the concentration sensing element, the voltage sensing element, and combinations thereof. The signal collection member 402 can be reasonably selected according to the practical requirements.

During a signal collection process, only by fixing the signal collection member 402 on the substrate 401, connecting the signal collection member 402 to the signal collection line 4021, and connecting the signal collection assembly 400 with the power battery, the signal collection assembly 400 can be used to collect signals of various data, such as a temperature, a battery gas pressure, an electrolyte concentration, and a humidity, without adding a new component in the signal collection assembly 400. In this way, it is convenient for use, and the related data of the power battery is collected efficiently, and an accuracy of data collected by the signal collection assembly 400 can be ensured.

In some embodiments, the signal collection terminal 403 is configured to collect a signal of the power battery module 420. In some embodiments of the present disclosure, the signal collection terminal 403 is made of metal sheet. In some embodiments, the signal collection terminal 403 is made of at least one of aluminum, nickel, copper, and alloys thereof. In some embodiments of the present disclosure, the signal collection assembly 400 includes a plurality of the signal collection terminals 403, and the signal collection terminals 403 are arranged and spaced apart from one another on the substrate 401.

In some embodiments of the present disclosure, a first terminal of the signal collection terminal 403 is connected with the signal collection line 4021, and a second terminal of the signal collection terminal 403 is connected with the power connection member 430 or an electrode post of the battery 101 so as to collect signals from the power battery module 420. The number and arrangement manner of the signal collection terminal 403 could be reasonably regulated according to service condition and arrangement manner of the batteries of the power battery module. The signal collection line 4021 on the substrate 401 and the signal collection terminal 403 form a conductive path for collecting corresponding signals. The signal collection terminal 403 may be formed by etching, such as etching a conductive metal layer on the substrate.

In some embodiments of the present disclosure, the second terminal of the signal collection terminal 403 extends beyond the substrate 401, and a part, which is disposed on the substrate 401, of the signal collection terminal 403 is formed by etching. Then it is convenient to connect the signal collection terminal 403 with the substrate 401, and an effect of signal transmission could be ensured.

In some embodiments of the present disclosure, the signal collection member 400 further includes a protection component 406 disposed on the substrate 401 and connected with the signal collection line 4021. In some embodiments of the present disclosure, the protection component 406 may be a fuse or formed by a part of a circuit on the substrate, which may be selected according to actual using conditions. The protection component 406 is configured to provide an overcurrent protection for the battery so as to improve safety performance of the signal collection assembly.

In some embodiments of the present disclosure, the protection component 406 is a chip fuse connected with the signal collection line 4021 via tin soldering, and the number of the protection component 406 may be reasonably regulated according to the number of the batteries 421. The protection component 406 has a wide source, could be connected with a flexible circuit layer of the signal collection line 4021 easily, and easy to assemble, which may provide a protection for the whole power battery module.

Furthermore, in an embodiment of the present disclosure, the signal collection assembly 400 further includes a protection film 405 disposed on the substrate 401 for covering the signal collection line 4021, the signal collection terminal 403 and the signal collection member 402. In some embodiments, the protection film 405 can integrate the signal collection line 4021, the signal collection terminal 403 and the signal collection member 402 on the substrate 401. The protection film 405 is insulative, resistant to pressure and wear, and can improve a structure sealing property of the signal collection assembly 400. Moreover, the protection film 405 has a function of protecting the signal collection member 402 and the signal collection line 4021, such that the safety and reliability of the signal collection assembly 400 can be ensured.

In some embodiments of the present disclosure, the substrate 401 and the signal collection line 4021 are configured as a FPC board, and the signal collection line 4021 are formed on the substrate 401 by etching. In an embodiment of the present disclosure, the FPC board includes a conductive metal foil and a protective film 4031 covering two sides of the conductive metal foil. The protective film 4031 is formed by a part of the substrate 401 or made from a material same as that of the substrate 401. The signal collection line 4021 is formed by etching the conductive metal foil. Furthermore, a protection film 405 is disposed on the protective film 4031 disposed at one side of the conductive metal foil.

In other words, the substrate 401, the signal collection line 4021, and the signal collection member 402 of the signal collection assembly 400 form a FPC board, the FPC board includes a conductive metal foil and a protective film covering on the conductive metal foil, the protective film is formed by a part of the substrate 401, and the signal collection line 4021 is formed by etching the conductive metal foil.

The signal collection assembly 400 according to the embodiment of the present disclosure further includes a connector 404 coupled with the second terminal of the signal collection line 4021. In some embodiments, the connector 404 is disposed on the substrate 401. Alternatively, the connector 404 is disposed at the edge of the substrate 401, and the second terminal of the signal collection line 4021 extends to the edge of the substrate 401. The structure and arrangement of the connector 404 in the present embodiment are similar to those of the connector 404 in above embodiments of the present disclosure, and thus details thereof are omitted herein.

As shown in FIG. 2, embodiments of the present disclosure also provide a power battery module 420. The power battery module 420 includes a battery group and the signal collection assembly 400. The battery group includes a plurality of batteries 421, adjacent batteries 421 are electrically connected with each other by the power connection member 430. The signal collection terminal 403 of the signal collection assembly 400 is electrically connected with the power connection member 430, for example, the second terminal of the signal collection terminal 403 is connected to the power connection member 430 of the power battery module 420.

The power battery module 420 according to embodiments of the present disclosure includes the signal collection assembly 400 described above, and thus the above advantages illustrated for the signal collection assembly 400 may be applied on the power battery module 420. For example, the signal collection line 4021, the signal collection member 402 and the signal collection terminal 403 are integrated on the substrate 401. Thus, the signal collection assembly 400 has a small size, a light weight, a low cost and is easy to be manufactured and assembled, thus increasing an assembly efficiency and being suitable for the automatic production.

The power connection member of the present disclosure could be any common power connection member that known to those skilled in the art. For example, in one embodiment of the present disclosure, as shown in FIG. 2, the power connection member 430 is configured as a metal connection sheet having an arch shape, and two ends of the metal connection sheet are connected with electrode terminals of the batteries respectively.

There is no special limitation to a connection manner between the power connection member 430 and the battery 421, for example, the connection manner may be a welding or screw fastening. In an embodiment of the present disclosure, the power connection member 430 is welded with the electrode terminal of the battery 421. In another embodiment of the present disclosure, a mounting hole is formed in the signal collection assembly 400, and a retaining member (not shown) is disposed on the battery group. The signal collection assembly 400 is pre-positioned onto the battery group by a connection between the mounting hole and the retaining member. Thus, the signal collection assembly 400 may be connected with the battery group in different manners, i.e. the connection manner between the power connection member 430 and the battery group is various, thus providing a high adaptability.

There is no special limitation to the connection manner between the batteries 421. In an embodiment of the present disclosure, the plurality of batteries 421 are connected with each other via a series connection, a parallel connection or a hybrid (such as, series-parallel) connection, and the connection thereof may be formed by an impulse welding, a laser beam welding or a mechanical connection.

It should be noted that other components and operations of the power battery module 420 may be known to those skilled in the art, thus details thereof are omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A signal collection assembly of a power battery module, comprising:
   a substrate;
   a plurality of signal collection lines, each of the signal collection lines including a sheet conductive metal element disposed on the substrate, wherein the sheet conductive metal element is formed by etching a conductive metal foil;
   a plurality of signal collection members disposed on the substrate, each of the signal collection members being connected with one of the signal collection lines; and a plurality of signal connection terminals disposed on the substrate spaced apart from each other, each of the signal connection terminals including a first terminal connected with a wire formed on the substrate and a second terminal to be connected with a power connection member of one of a plurality of batteries of the power battery module, wherein at least one of the signal collection members is disposed on a portion of one of the signal connection terminals, the portion being disposed on the substrate;

wherein the substrate and the signal collection lines are configured as an FPC board, and each of the signal collection lines is formed on the substrate, and wherein the FPC board comprises:
the conductive metal foil; and
a protective film disposed on two sides of the conductive metal foil and formed by a part of the substrate, and wherein a protection film is provided on the protective film on one side of the conductive metal foil, the protection film is disposed on the substrate, and the protection film covers and integrates the signal collection lines, the signal connection terminals, and the signal collection members.

2. The signal collection assembly according to claim 1, wherein the second terminal of each of the signal connection terminals extends beyond an edge of the substrate.

3. The signal collection assembly according to claim 1, further comprising a connector connected with the plurality of signal collection lines.

4. The signal collection assembly according to claim 1, wherein the substrate is a flexible board.

5. The signal collection assembly according to claim 1, wherein each of the signal collection lines includes a conductive metal sheet fixed on the substrate and wherein the conductive metal sheet is fixed on the substrate by at least one of adhering, injection molding, hot pressing or welding.

6. The signal collection assembly according to claim 1, wherein each of the signal collection lines includes a conductive metal layer including a conductive metal coating formed on the substrate.

7. The signal collection assembly according to claim 1, wherein each of the signal collection lines is formed by etching the conductive metal foil disposed on the substrate.

8. The signal collection assembly according to claim 1, wherein the substrate comprises a plurality of line slots formed in a surface thereof, and each of the signal collection lines is disposed in one of the line slots.

9. The signal collection assembly according to claim 1, wherein each of the signal connection terminals is made of a metal sheet.

10. The signal collection assembly according to claim 1, further comprising a protection component disposed on the substrate and connected with the wire formed on the substrate.

11. The signal collection assembly according to claim 10, wherein the protection component includes a chip fuse connected with the wire via tin soldering.

12. A power battery module, comprising:
a signal collection assembly comprising:
a substrate;
a plurality of signal collection lines, each of the signal collection lines including a sheet conductive metal element disposed on the substrate, wherein the sheet conductive metal element is formed by etching a conductive metal foil;
a plurality of signal collection members disposed on the substrate, each of the signal collection members being connected with one of the signal collection lines; and
a plurality of signal connection terminals disposed on the substrate spaced apart from each other, each of the signal connection terminals including a first terminal connected with a wire formed on the substrate and a second terminal connected with one of a plurality of power connection members of the power battery module, wherein at least one of the signal collection members is disposed on a portion of one of the signal connection terminals, the portion being disposed on the substrate;

wherein the substrate and the signal collection lines are configured as an FPC board, and each of the signal collection lines is formed on the substrate, and wherein the FPC board comprises:
the conductive metal foil; and
a protective film disposed on two sides of the conductive metal foil and formed by a part of the substrate, and wherein a protection film is provided on the protective film on one side of the conductive metal foil, the protection film is disposed on the substrate, and the protection film covers and integrates the signal collection lines, the signal connection terminals, and the signal collection members; and a battery group comprising a plurality of batteries, adjacent batteries being electrically connected with each other by one of the power connection members of the power battery module, wherein the second terminal of each of the signal connection terminals of the signal collection assembly is electrically connected with one of the power connection members.

13. The power battery module according to claim 12, wherein each of the power connection members is welded to an electrode terminal of one of the plurality of batteries.

14. The power battery module according to claim 12, wherein a mounting hole is formed in the signal collection assembly, a retaining member is disposed on the battery group, and the battery group is pre-retained in the signal collection assembly by a cooperation between the mounting hole and the retaining member.

15. The signal collection assembly according to claim 1, wherein each of the signal collection members is disposed on a portion of one of the signal connection terminals, the portion being disposed on the substrate.

16. The signal collection assembly according to claim 1, wherein at least one of the signal collection members is one of a humidity sensor, a battery gas pressure sensor, or a battery electrolyte concentration sensor.

* * * * *